US008155020B2

(12) United States Patent
Giaretta et al.

(10) Patent No.: US 8,155,020 B2
(45) Date of Patent: Apr. 10, 2012

(54) POLICY CONTROL AND CHARGING (PCC) RULES BASED ON MOBILITY PROTOCOL

(75) Inventors: Gerardo Giaretta, San Diego, CA (US); Kalle I. Ahmavaara, San Diego, CA (US); Lorenzo Casaccia, Rome (IT); George Tsirtsis, London (GB); Arungundram C. Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 12/352,734

(22) Filed: Jan. 13, 2009

(65) Prior Publication Data

US 2009/0182883 A1 Jul. 16, 2009

Related U.S. Application Data

(60) Provisional application No. 61/021,013, filed on Jan. 14, 2008.

(51) Int. Cl.
*G01R 31/08* (2006.01)

(52) U.S. Cl. ........ 370/252; 370/254; 370/331; 370/336; 370/339; 370/463; 709/224; 709/228; 709/229; 709/230; 709/231; 455/407; 455/408; 455/436; 455/450

(58) Field of Classification Search .................. 370/252, 370/254, 255, 331, 336, 338, 339, 463; 709/224, 709/228, 229, 230, 231; 455/407, 408, 436, 455/450
See application file for complete search history.

(56) References Cited

U.S. PATENT DOCUMENTS

| 7,606,895 | B1 * | 10/2009 | Dini et al. ............... 709/224 |
| 7,610,037 | B2 * | 10/2009 | Stura et al. .............. 455/406 |
| 7,773,571 | B1 * | 8/2010 | Maxwell et al. .......... 370/338 |
| 7,792,059 | B2 * | 9/2010 | Fonseca et al. .......... 370/255 |
| 2005/0117586 | A1 * | 6/2005 | Ikeda et al. ........... 370/395.21 |

(Continued)

FOREIGN PATENT DOCUMENTS

WO WO 2006020011 A1 2/2006

(Continued)

OTHER PUBLICATIONS

International Search Report and Written Opinion—PCT/US2009/030922, International Search Authority—European Patent Office—Dec. 6, 2009.
Jee-Hyon Na, et al., "An Efficient Diameter-Based Accounting Scheme for Wireless Metropolitan Area Network (WMAN)" 2004 IEEE 60th Vehicular Technology Conference. VTC2004-Fall-26-29 Sep. 2004—Los Angeles, CA, USA, IEEE—Piscataway, vol. 7, Sep. 26, 2004, pp. 5072-5076, XP010790542.

(Continued)

*Primary Examiner* — Phirin Sam
*Assistant Examiner* — Andrew C Lee
(74) *Attorney, Agent, or Firm* — François A. Pelaez

(57) ABSTRACT

Techniques for supporting policy control and charging (PCC) functions in a wireless communication network are described. In one design, a Policy Control and Charging Rules Function (PCRF) may receive a request from a first network entity (e.g., a home agent) to establish a PCC session for a user equipment (UE) accessing the first network entity using a mobility protocol (e.g., Mobile IP). The PCRF may determine the mobility protocol used by the UE based on an IP-CAN Type parameter included in the request. The PCRF may determine PCC rules for the PCC session based on the mobility protocol and may send the PCC rules to the first network entity. The first network entity may apply the PCC rules on packets for the PCC session and may count each packet for charging. A second network entity may forward the packets but would not count these packets for charging.

27 Claims, 9 Drawing Sheets

U.S. PATENT DOCUMENTS

| | | | |
|---|---|---|---|
| 2005/0213721 A1* | 9/2005 | Hakala et al. | 379/114.01 |
| 2006/0002422 A1* | 1/2006 | Hurtta | 370/465 |
| 2006/0072595 A1* | 4/2006 | Broberg et al. | 370/410 |
| 2007/0004380 A1* | 1/2007 | Ylikoski | 455/405 |
| 2007/0281699 A1* | 12/2007 | Rasanen | 455/436 |
| 2008/0229385 A1* | 9/2008 | Feder et al. | 726/1 |
| 2009/0043902 A1* | 2/2009 | Faccin | 709/229 |
| 2010/0154029 A1* | 6/2010 | Fernandez Alonso et al. | 726/1 |
| 2010/0217855 A1* | 8/2010 | Przybysz et al. | 709/223 |
| 2010/0217877 A1* | 8/2010 | Willars et al. | 709/228 |

FOREIGN PATENT DOCUMENTS

| | | |
|---|---|---|
| WO | WO 2007026268 A1 | 3/2007 |
| WO | WO 2007082587 | 7/2007 |

OTHER PUBLICATIONS

Qualcomm Europe et al: "Usage of IPCAN Type, Rat Type and Other Identifiers in Release 8" 3GPP Draft; S2-081653 Rev-S2-081312 - 23 203 Types, 3rd Generation Partnership Project (3GPP), vol. SA WG2, No. Athens; Feb. 14, 2008, XP050263994.

Universal Mobile Telecommunications Systems (UMTS); Policy and charging control over Rx reference point (3GPP TS 29.214 version 7.1.0 Release 7), ETSI TS 129 214, V7.1.0, Sophia Antipolis Cedex—France, Jun. 2007, section 4 - 5.5.

* cited by examiner

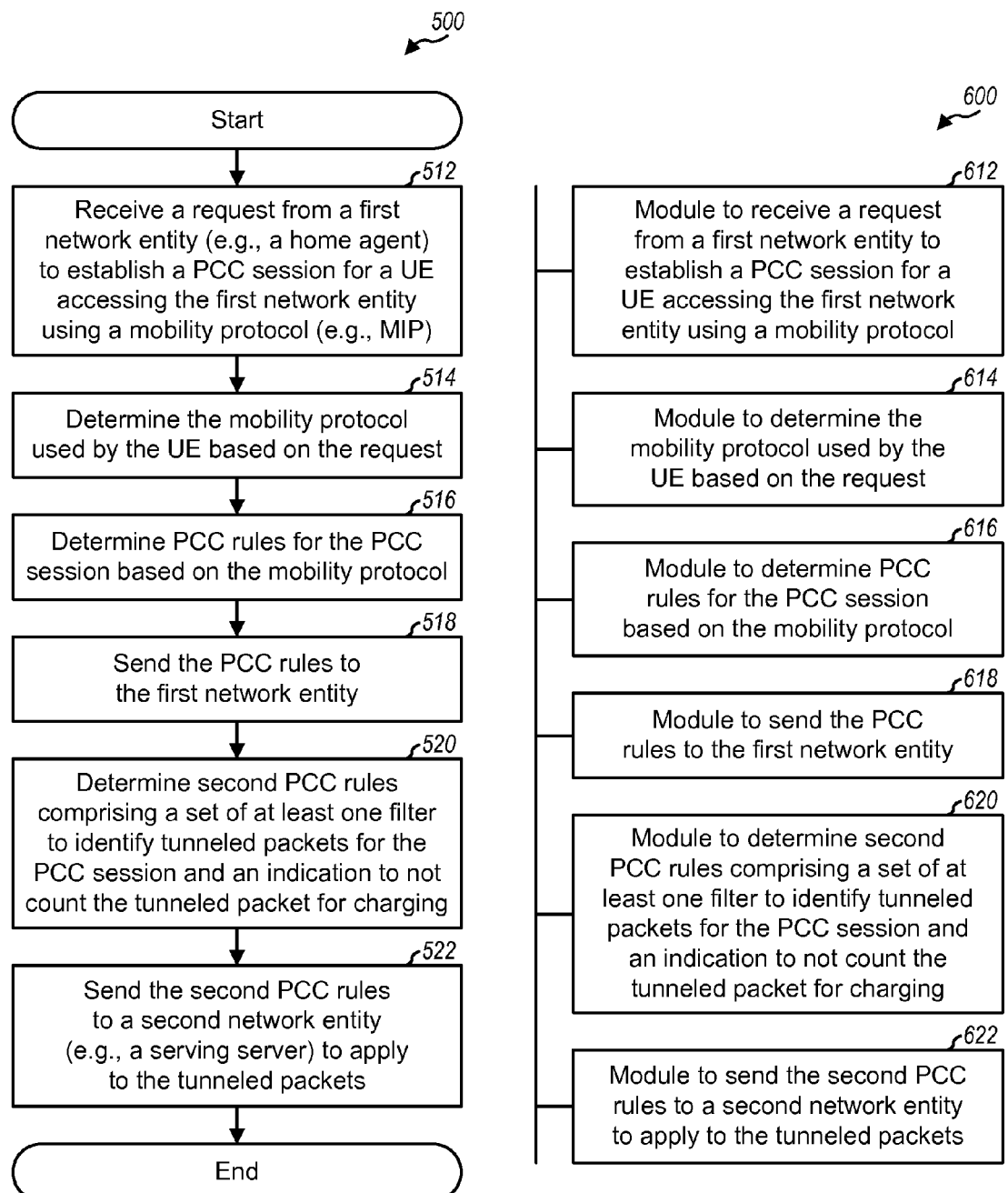

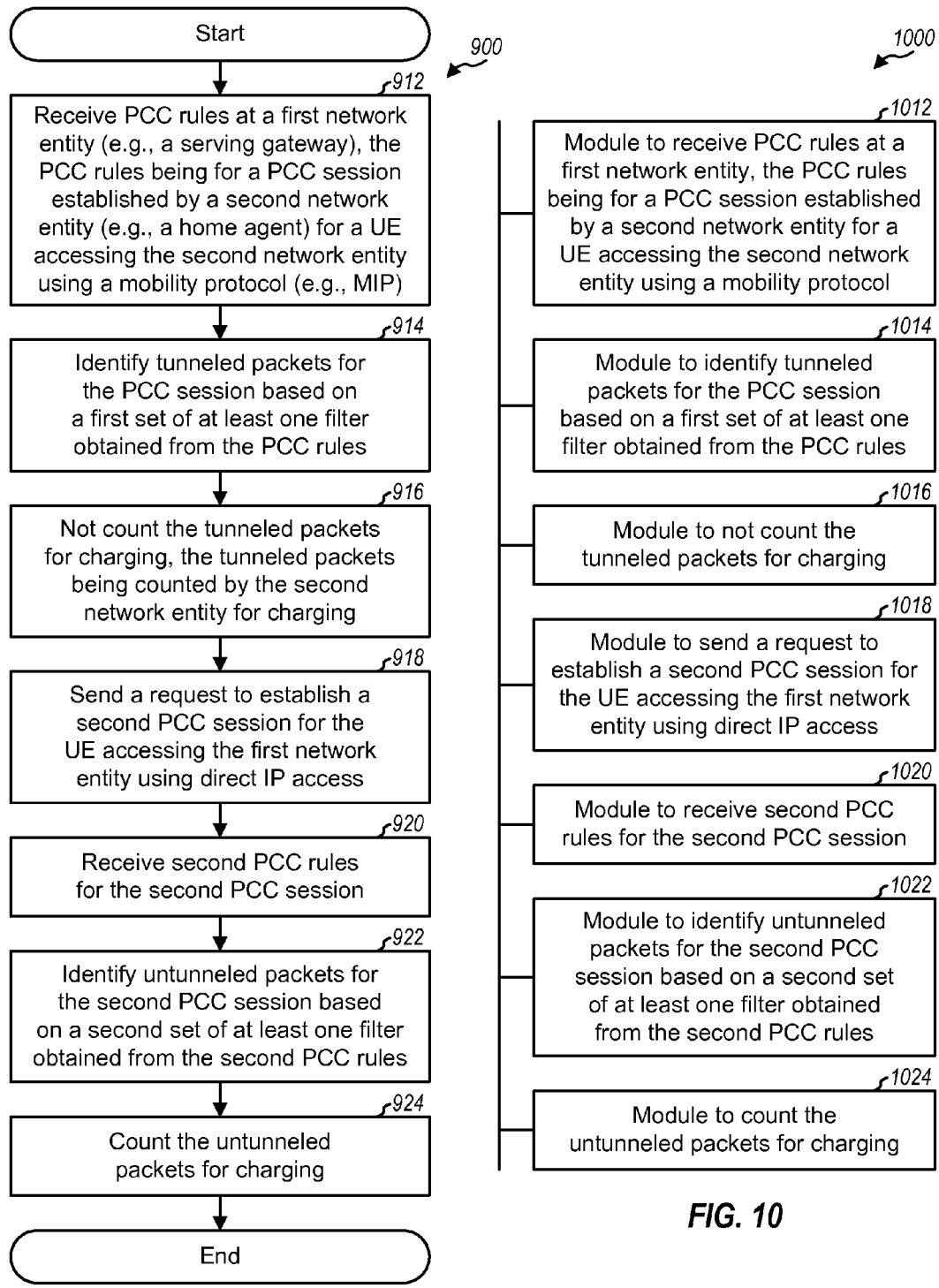

POLICY CONTROL AND CHARGING (PCC) RULES BASED ON MOBILITY PROTOCOL

The present application claims priority to provisional U.S. Application Ser. No. 61/021,013, entitled "PCC RULES BASED ON IP-CAN FOR MOBILE IP," filed Jan. 14, 2008, assigned to the assignee hereof and incorporated herein by reference.

BACKGROUND

I. Field

The present disclosure relates generally to communication, and more specifically to techniques for supporting policy control and charging (PCC) functions in a wireless communication network.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A user equipment (UE) may communicate with a wireless network in order to exchange data with a remote entity (e.g., another UE). The UE may exchange packets of data with the remote entities, and these packets may be routed through various network entities in the wireless network. The packets may be processed differently by the network entities depending on whether or not the UE is using a mobility protocol such as Mobile Internet Protocol (MIP) to support roaming. It may be desirable to properly support PCC functions regardless of whether or not a mobility protocol is used by the UE.

SUMMARY

Techniques for supporting PCC functions in a wireless communication network are described herein. In an aspect, PCC rules for a PCC session may be determined based on (i.e., by taking into account) a parameter that can indicate whether a mobility protocol is used by a UE. This parameter may be an IP-CAN Type parameter that is present in PCC signaling. The PCC rules determined in this manner may provide certain advantages, as described below.

In one design, a Policy Control and Charging Rules Function (PCRF) (or an equivalent network entity) may receive a request/indication from a first network entity (e.g., a home agent) to establish a PCC session for a UE accessing the first network entity using a mobility protocol (e.g., MIP). The request may include the IP-CAN Type parameter, which may be set to the mobility protocol. The PCRF may determine the mobility protocol used by the UE based on the IP-CAN Type parameter and may ascertain PCC rules for the PCC session based on the mobility protocol. The PCC rules may include a first set of at least one filter to identify packets for the PCC session, an indication of whether to count the packets for charging, quality-of-service (QoS) rules for the packets, charging information for the PCC session, and/or other information related to the PCC session. The PCRF may send the PCC rules to the first network entity, which may apply the PCC rules on the packets for the PCC session and may count each packet for charging.

The packets for the PCC session may be encapsulated in tunneled packets, which may be exchanged between the UE and the first network entity via a second network entity (e.g., a serving gateway). In this case, the PCRF may determine second PCC rules for the second network entity. The second PCC rules may include (i) a second set of at least one filter to identify the tunneled packets and (ii) an indication to not count the tunneled packets for charging, which may be implicitly provided by the absence of charging information in the second PCC rules. The PCRF may send the second PCC rules to the second network entity, which may apply the second PCC rules on the tunneled packets. The tunneled packets may be counted only once for charging by the first network entity and not by the second network entity.

Various aspects and features of the disclosure are described in further detail below.

BRIEF DESCRIPTION OF THE DRAWINGS

FIGS. 5 and 6 show a process and an apparatus, respectively, to support PCC functions by a PCRF.

FIGS. 9 and 10 show a process and an apparatus, respectively, to support PCC functions by a serving gateway.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000 (CDMA2000 1X), IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). The techniques described herein may be used for the networks and radio technologies given above as well as other networks and radio technologies. For clarity, certain aspects of the techniques are described below for LTE, and LTE terminology is used in much of the description below.

Figure 1:
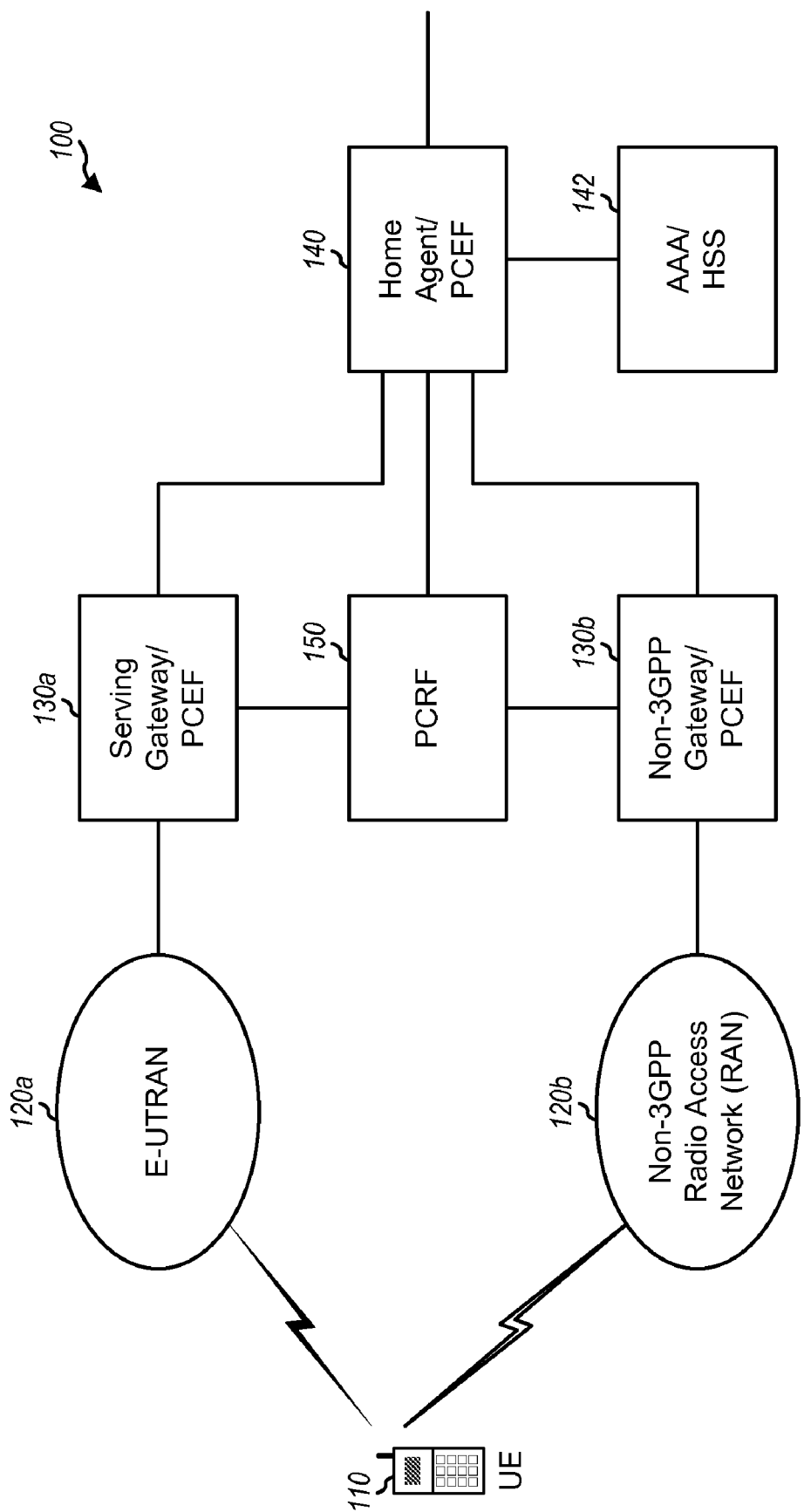
FIG. 1 shows an example network deployment.

FIG. 1 shows an example network deployment 100. A UE 110 may communicate with an Evolved Universal Terrestrial Radio Access Network (E-UTRAN) 120a or a non-3GPP radio access network (RAN) 120*b* in order to receive one or more data services such as Internet connectivity, short message service (SMS), instant messaging (IM), wireless application protocol (WAP) access, multimedia streaming, multimedia messaging, etc. UE 110 may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

E-UTRAN 120*a* may include evolved Node Bs (eNBs) that support radio communication for UEs. An eNB may be a fixed station that communicates with the UEs and may also be referred to as a Node B, a base station, an access point, etc. A serving gateway (SGW) 130*a* may terminate the interface towards E-UTRAN 120*a* and may perform various functions such as support for handover of UEs between eNBs, buffering, routing and forwarding of data for UEs, initiation of network-triggered service request procedure, accounting functions for charging, etc. A home agent (HA) 140 may communicate with serving gateway 130*a* directly or indirectly and may support one or more mobility protocols such as MIP, Proxy MIP (PMIP), Dual Stack Mobile IPv6 (DSMIPv6), Mobile IPv4 collocated care-of-address (MIPv4-CCoA), General Packet Radio Services (GPRS) Tunneling Protocol (GTP), etc. Home agent 140 may maintain current location information for roaming UEs and may route packets for these UEs. Home agent 140 may be a gateway dedicated as a home agent or a gateway that can provide home agent functionality as well as other functionalities.

Although not shown in FIG. 1, a Packet Data Network (PDN) gateway may couple between serving gateway 130*a* and home agent 140. The PDN gateway may perform functions such as packet filtering and IP address allocation for UEs, service level gating control and rate enforcement, dynamic host configuration protocol (DHCP) functions for client and server, gateway GPRS support node (GGSN) functionality, etc. An Authentication, Authorization and Accounting/Home Subscriber Server (AAA/HSS) 142 may store subscription-related information (e.g., user profiles) and location information for UEs. AAA/HSS 142 may perform authentication and authorization of UEs and may provide information for UEs to requesting network entities.

Non-3GPP RAN 120*b* may be a CDMA2000 1X network, a WiMAX network, a Wi-Fi network, or some other type of RAN. Non-3GPP RAN 120*b* may interface with a non-3GPP gateway 130*b*, which may perform functions similar to those performed by serving gateway 130*a*.

A PCRF 150 and a Policy and Charging Enforcement Function (PCEF) may collectively support PCC functions. An instance of the PCEF may be collocated with each of gateways 130*a* and 130*b* and home agent 140, as shown in FIG. 1. PCRF 150 may act as a controller for PCC, receive service information from Application Functions (AFs), and provide PCC rules to the PCEFs. The PCEFs may enforce the PCC rules provided by PCRF 150. For example, a PCEF may set up QoS for an IP flow and may provide charging function for the IP flow based on the PCC rules. An IP flow may also be referred to as a data flow, etc. The PCC, PCRF and PCEF are described in 3GPP TS 23.203, entitled "Policy and charging control architecture," which is publicly available.

The network entities in FIG. 1 may also be referred to by other names. For example, the PCEF for a serving gateway may be referred to as a Bearer Binding and Event Reporting Function (BBERF).

The RANs and network entities in FIG. 1 may belong in one or more public land mobile networks (PLMNs). For example, a home PLMN (HPLMN) may include home agent 140 and AAA/HSS 142, and a visited PLMN (VPLMN) may include E-UTRAN 120*a* and serving gateway 130*a*. Non-3GPP RAN 120*b* and non-3GPP gateway 130*b* may belong in the HPLMN or VPLMN. PCRF 150 may include a home PCRF (H-PCRF) in the HPLMN and a visited PCRF (V-PCRF) in the VPLMN. Each PLMN may also include other network entities not shown in FIG. 1.

FIG. 1 shows some network entities that can support IP Connectivity Access Network (IP-CAN). IP-CAN is a collection of network entities and interfaces that provides IP transport connectivity between the UEs and core network entities. The network entities in FIG. 1 may communicate directly or indirectly with one another, e.g., via one or more data networks. The network entities in FIG. 1 are described in 3GPP TS 36.300, entitled "Evolved Universal Terrestrial Radio Access (E-UTRA) and Evolved Universal Terrestrial Radio Access Network (E-UTRAN); Overall description," and in 3GPP TS 23.401, entitled "General Packet Radio Service (GPRS) enhancements for Evolved Universal Terrestrial Radio Access Network (E-UTRAN) access." These documents are publicly available from 3GPP.

UE 110 may obtain Internet connectivity via direct IP access and/or mobile IP access. Direct IP access refers to exchange of IP packets between UE 110 and a remote entity with no support for mobility of the UE. Mobile IP access refers to exchange of IP packets between UE 110 and a remote entity via a network entity that may keep track of the whereabouts of the UE and forward the IP packets to the UE using tunneling. Mobile IP access may be supported using MIP, PMIP, DSMIPv6, MIPv4-CCoA, GTP, or some other mobility protocol. For example, UE 110 may obtain direct IP access via serving gateway 130*a* or non-3GPP gateway 130*b* and may exchange IP packets via gateway 130*a* or 130*b* without tunneling. UE 110 may also obtain mobile IP access via home agent 140 using a mobility protocol such as MIP. For mobile IP access, IP packets may be tunneled between UE 110 and home agent 140 via gateway 130*a* or 130*b*.

Figure 2:
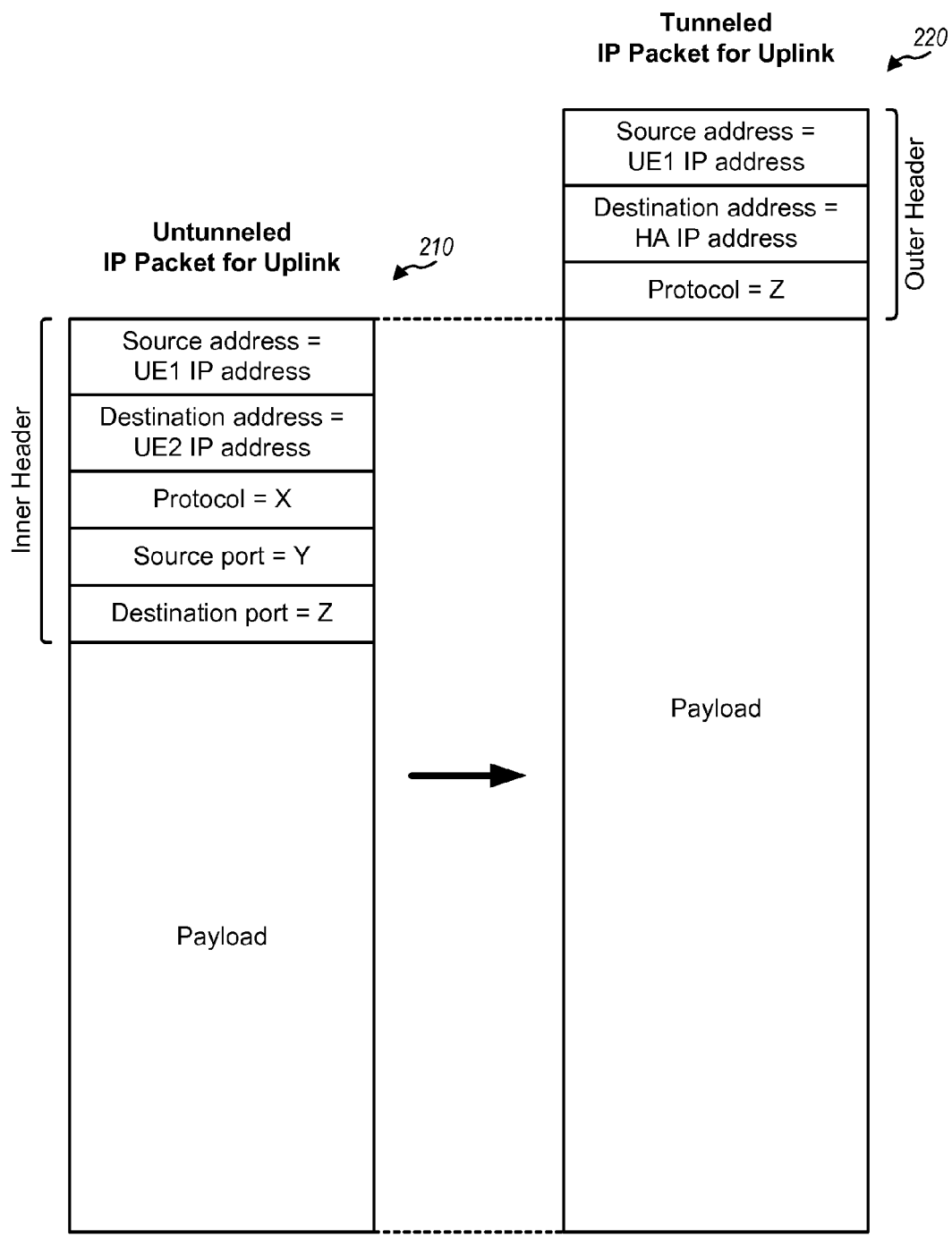
FIG. 2 shows packet processing to tunnel an Internet Protocol (IP) packet.

FIG. 2 shows an example of processing to tunnel an IP packet sent on the uplink from UE 110 to home agent 140. UE 110 may communicate with another UE and may generate an IP packet 210 to send to the other UE. IP packet 210 includes an IP header and a payload. The IP header includes various fields including a source address field, a destination address field, and a protocol field. The source address field may be set to the IP address of UE 110 (UE1 IP address), the destination address field may be set to the IP address of the other UE (UE2 IP address), and the protocol field may be set to a transport layer protocol (e.g., TCP, UDP, etc.) used for the data sent in the payload. The payload of IP packet 210 may carry a transport layer datagram, which may include a header and a payload. The transport layer header may include (i) a source port field that may be set to a port at UE 110 (port Y) and (ii) a destination port that may be set to a port at the other UE (port Z). The source address, destination address, and protocol fields of the header of IP packet 210 and the source port and destination port fields of the header of the transport layer datagram may be considered as fields of an inner header.

IP packet 210 is an untunneled packet and may be encapsulated in a tunneled IP packet 220 by UE 110 for the uplink. For tunneled IP packet 220, the source address field may be set to the IP address of UE 110 (UE1 IP address), and the destination address field may be set to the IP address of home agent 140 (HA IP address). The source address, destination address, and protocol fields of the header of IP packet 220 may be considered as fields of an outer header.

A tunneled IP packet for the downlink may be generated in similar manner, albeit with the following differences. In the outer header, the source address may be set to the IP address of home agent 140, and the destination address may be set to the IP address of UE 110.

For the uplink, UE 110 may perform tunneling for IP packets, and home agent 140 may perform de-tunneling. UE 110 may send tunneled IP packets toward gateway 130a or 130b, which may forward the tunneled IP packets to home agent 140. For the downlink, home agent 140 may perform tunneling for IP packets, and UE 110 may perform de-tunneling. Home agent 140 may send tunneled IP packets toward gateway 130a or 130b, which may forward the tunneled IP packets to UE 110. For simplicity, IP packets are also referred to as simply packets in the description below.

Referring back to FIG. 1, PCRF 150 may send PCC rules for PCC sessions to the PCEFs. A PCC session may be established between PCRF 150 and serving gateway 130a, non-3GPP gateway 130b, or home agent 140 and may cover one or more IP flows. Each IP flow may be identified by a set of parameters, which may include the source address, the destination address, the transport layer protocol, the source port, and the destination port shown in FIG. 2. The PCC rules for each PCC session may include information on the IP flows in the PCC session, QoS rules or policy to apply on the IP flows, charging information for the IP flows, and/or other information related to the PCC session. The QoS rules may indicate the bandwidth, delay and priority for the IP flows, whether to block or pass packets in the IP flows, etc. The charging information may indicate the charging mechanism(s) for the IP flows, e.g., flat rate, time based, or packet count based charging.

When a mobility protocol such as MIP is used, packets may be tunneled between UE 110 and home agent 140 via gateway 130, which may be serving gateway 130a or non-3GPP gateway 130b. Gateway 130 should be aware that packets are tunneled in order to correctly apply the applicable PCC rules.

Furthermore, there may be scenarios in which both home agent 140 and gateway 130 have active PCC sessions for charging with PCRF 150. This may occur, for example, if UE 110 has direct IP access via gateway 130 and also has mobile IP access via home agent 140. Gateway 130 may forward both untunneled packets for the direct IP access as well as tunneled packets from home agent 140 for the mobile IP access. Since both gateway 130 and home agent 140 are forwarding the tunneled packets, these packets should be counted only once in order to avoid duplicate charging. The same may also apply when home agent 140 and gateway 130 are collocated but have different PCC sessions with PCRF 150.

In an aspect, PCC rules for a PCC session may be determined based on a parameter that can indicate whether a mobility protocol is used by a UE. In one design, the parameter is an IP-CAN Type parameter that is present in PCC signaling. The IP-CAN Type parameter typically provides information about radio access type, e.g., E-UTRA, UTRA, CDMA2000 1X, WiMAX, Wi-Fi, etc. The IP-CAN Type parameter may be expanded to provide information about mobility protocol. For example, the IP-CAN Type parameter may indicate (i) whether or not a mobility protocol is used by a UE or (ii) which mobility protocol is used, e.g., MIP, PMIP, DSMIPv6, MIPv4-CCoA, GTP, etc. The IP-CAN Type parameter may be used to distinguish between tunneled packets and untunneled packets, as described below.

For a PCC session between gateway 130 (e.g., serving gateway 130a or non-3GPP gateway 130b) and PCRF 150 for direct IP access, the IP-CAN Type parameter may be set to a radio access type. Gateway 130 may then count untunneled packets for the PCC session for charging, and home agent 140 may skip counting the untunneled packets.

For a PCC session between home agent 140 and PCRF 150 for mobile IP access, the IP-CAN Type parameter may be set to a mobility protocol (e.g., MIP). This PCC session may be associated with tunneled packets, and the PCC rules for the PCC session may refer to the tunneled packets. Home agent 140 may count the tunneled packets for charging. Gateway 130 will not count the tunneled packets for charging since it would not have a PCC session with the IP-CAN Type parameter set to a mobility protocol.

Table 1 summarizes the use of the IP-CAN Type parameter to convey different types of PCC session. Table 1 also summarizes the action performed by each network entity for each type of PCC session.

TABLE 1

|  | IP-CAN Type set to a radio access type | IP-CAN Type set to a mobility protocol |
| --- | --- | --- |
| Used for | PCC session with direct IP access | PCC session with mobile IP access |
| Charging | Gateway counts untunneled packets. Home agent ignores the untunneled packets. | Home agent counts tunneled packets. Gateway ignores the tunneled packets. |

Figure 3:
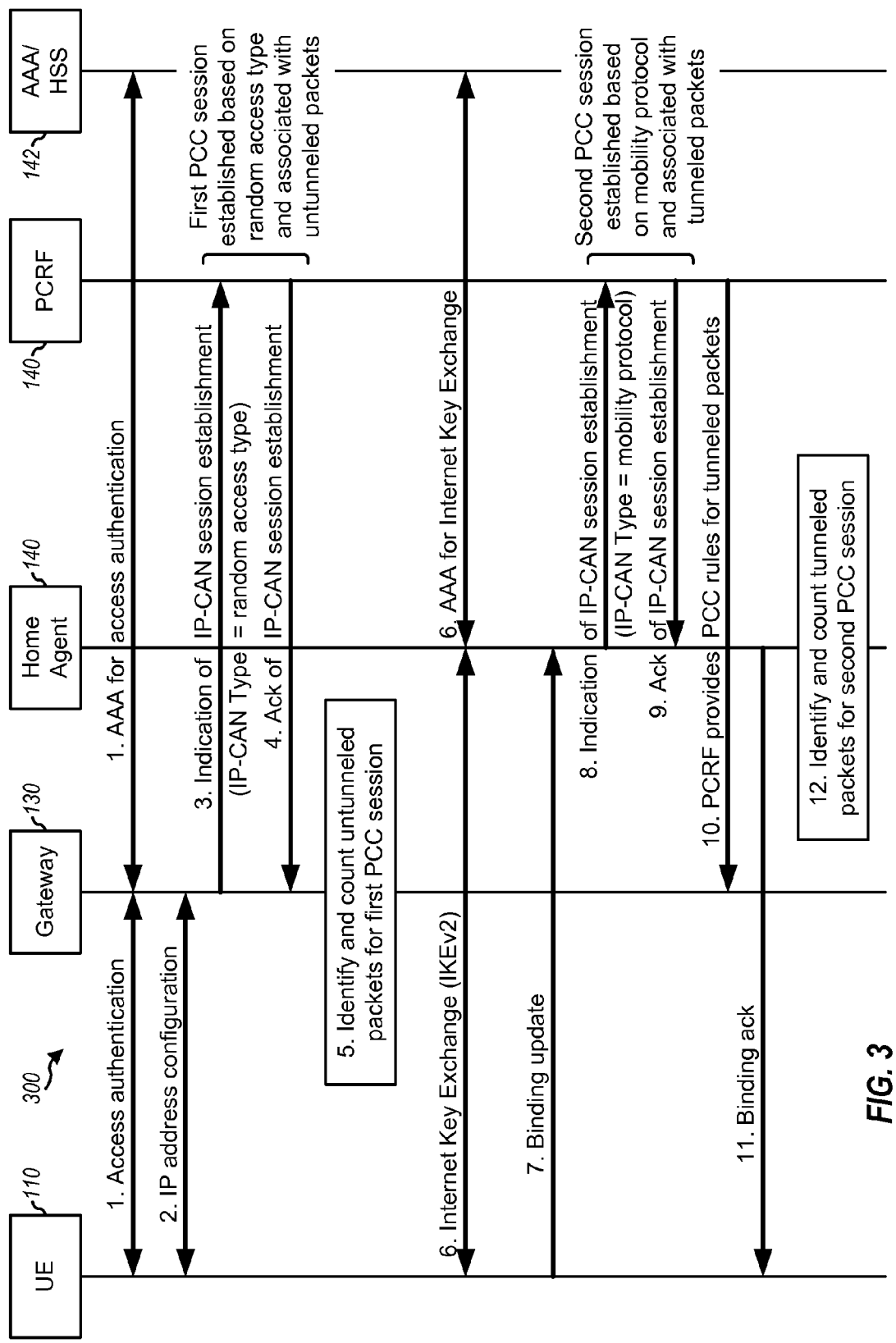
FIGS. 3 and 4 show two processes to support PCC using IP-CAN Type.

FIG. 3 shows a design of a process 300 to support PCC using the IP-CAN Type parameter. UE 110 may access a RAN (e.g., E-UTRAN 120a or non-3GPP RAN 120b in FIG. 1) and may communicate with gateway 130 (e.g., serving gateway 130a or non-3GPP gateway 130b) for access authentication (step 1). Gateway 130 may further communicate with AAA/HSS 142 for AAA and access authentication of UE 110 (also step 1). UE 110 may then perform IP address configuration with gateway 130 and may be assigned an IP address (step 2).

Gateway 130 may send a request/indication of IP-CAN bearer session establishment to PCRF 150 (step 3). The request may include a UE identity for UE 110, the IP-CAN Type parameter, and possibly other information. The IP-CAN Type parameter may identify the radio access type (e.g., E-UTRA, UTRA, WiMAX, etc.) for an IP-CAN session (or PCC session) to be established. PCRF 150 may determine that PCC authorization is required and may request for authorization of allowed service(s) and information on PCC rules from a local or external entity (not shown in FIG. 3). PCRF 150 may make an authorization and policy decision on the request from gateway 130 and may determine PCC rules for the PCC session based on the IP-CAN Type parameter and other information. PCRF 150 may then return an acknowledgement (Ack) of IP-CAN session establishment to gateway 130 (step 4). The acknowledgement may include the PCC rules, charging information, and/or other information for the PCEF at gateway 130. The PCEF may enforce the PCC rules from PCRF 150.

A first PCC session may be established between gateway 130 and PCRF 150 in steps 3 and 4. This PCC session may be associated with the radio access type given in the IP-CAN Type parameter sent in step 3 and the IP address assigned to UE 110 in step 2. This radio access-specific PCC session may also be associated with untunneled packets, which may be identified based on a service data flow template included in the PCC rules provided by PCRF 150 in step 4. The service data flow template may include a set of service data flow filters used to identify the untunneled packets for IP flows covered by the PCC session. Gateway 130 may detect for untunneled packets for the PCC session based on the service data flow template and may count these packets for charging as indicated by the charging information provided by PCRF 150 (block 5).

At a later time, UE 110 may desire to use MIP. UE 110 may determine that it is communicating with a visited network since an IP address prefix for its home network (HNP) is different from an IP address prefix for gateway 130. UE 110 may perform an Internet Key Exchange (IKEv2) to establish a secure association with home agent 140 (step 6). Home agent 140 may further communicate with AAA/HSS 142 for AAA for the Internet Key Exchange for UE 110 (also step 6). UE 110 may obtain a new IP address as a home address.

UE 110 may thereafter send a binding update and may provide its current location to home agent 140 (step 7). Home agent 140 may then send a request/indication of IP-CAN bearer session establishment to PCRF 150 (step 8). The request may include the IP-CAN Type parameter, which may identify the mobility protocol (e.g., MIP) for the IP-CAN session to be established. PCRF 150 may determine PCC authorization, if necessary, and may make a decision on the request from home agent 140. PCRF 150 may then return an acknowledgement of IP-CAN session establishment to home agent 140 (step 9). The acknowledgement may include the PCC rules, charging information, information about tunneling encapsulation header for the mobility protocol, and/or other information for the PCEF at home agent 140. The PCEF may enforce the PCC rules provided by PCRF 150. PCRF 150 may also provide gateway 130 with PCC rules for tunneled packets for the PCC session between home agent 140 and PCRF 150 (step 10). Gateway 130 may use the PCC rules to support QoS for the tunneled packets and/or perform other functions. Home agent 140 may also return a binding acknowledgement to UE 110 (step 11).

A second PCC session may be established between home agent 140 and PCRF 150 in steps 8 and 9. This PCC session may be associated with the mobility protocol given in the IP-CAN Type parameter sent in step 8 and the IP address assigned to UE 110 in step 6. This mobility protocol-specific PCC session may also be associated with tunneled packets, which may be identified based on a service data flow template included in the PCC rules provided by PCRF 150 in step 9. The service data flow template may include a set of service data flow filters used to identify the tunneled packets for IP flows covered by the PCC session. Home agent 140 may detect for tunneled packets for the PCC session based on the service data flow template and may count these packets for charging as indicated by the charging information provided by PCRF 150 (block 12).

Figure 4:
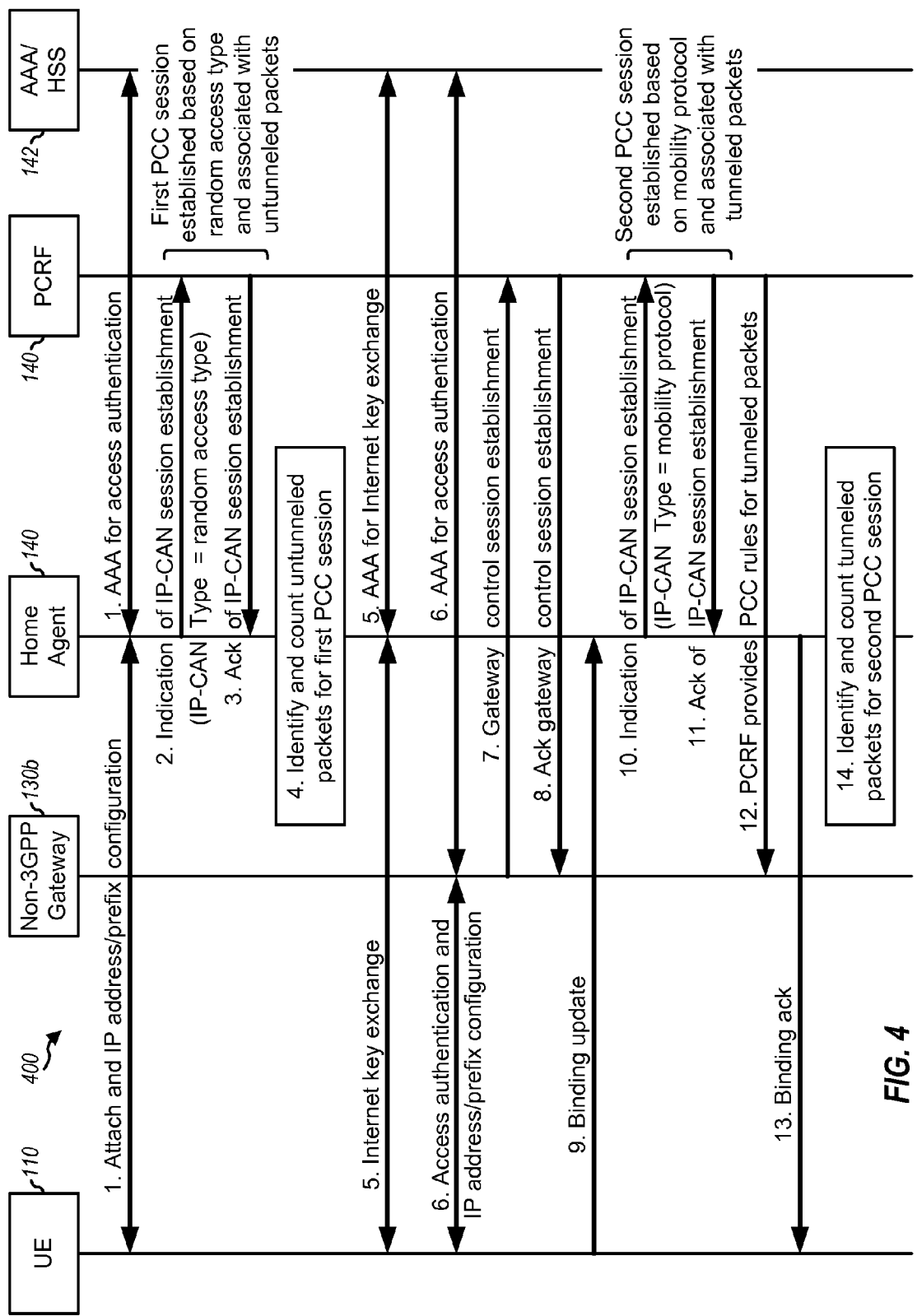

FIG. 4 shows a design of another process 400 to support PCC using the IP-CAN Type parameter. UE 110 may access E-UTRAN 120*a*, which may belong in the HLPMN for the UE. UE 110 may communicate with home agent 140 for IP address configuration (step 1). Home agent 140, which may be a PDN gateway in the HLPMN, may further communicate with AAA/HSS 142 for AAA and access authentication of UE 110 (also step 1). UE 110 may obtain an IP address and a home network prefix (HNP) from home agent 140.

Home agent 140 may send a request/indication of IP-CAN bearer session establishment to PCRF 150 (step 2). The request may include the IP-CAN Type parameter, which may identify the radio access type (e.g., E-UTRA) for the IP-CAN session to be established. PCRF 150 may determine PCC authorization, if necessary, and may make a decision on the request from home agent 140. PCRF 150 may then return an acknowledgement of IP-CAN session establishment to home agent 140 (step 3). The acknowledgement may include the PCC rules, charging information, and/or other information for the PCEF at home agent 140. The PCEF may enforce the PCC rules provided by PCRF 150.

A first PCC session may be established between home agent 140 and PCRF 150 in steps 2 and 3. This PCC session may be associated with the radio access type given in the IP-CAN Type parameter sent in step 2 and the HNP provided to UE 110 in step 1. Home agent 140 may detect for untunneled packets for the PCC session based on a service data flow template provided by PCRF 150 and may count these packets for charging (block 4).

UE 110 may perform an Internet Key Exchange to establish a secure association with home agent 140 (step 5). UE 110 may realize that it is in the HPLMN. As a result, a mobility protocol may not be activated, and a PCC session for the mobility protocol may not be established.

Thereafter, UE 110 may move to non-3GPP RAN 120*b* and may perform access authentication and IP address configuration with non-3GPP gateway 130*b* (step 6). Gateway 130*b* may further communicate with AAA/HSS 142 for AAA for access authentication of UE 110 (also step 6). Gateway 130*b* may communicate with PCRF 150 to establish a gateway control session (step 7) and may set the IP-CAN Type parameter to the radio access type (e.g., WiMAX) (step 7). PCRF 150 may establish the gateway control session for gateway 130*b* and may send an acknowledgement for the gateway control session establishment (step 8). The gateway control session may be associated with the radio access type provided by gateway 130*b*.

UE 110 may thereafter send a binding update and may provide its current location to home agent 140 (step 9). Home agent 140 may then send a request/indication of IP-CAN bearer session establishment to PCRF 150 (step 10). The indication may include the IP-CAN Type parameter, which may identify the mobility protocol (e.g., DSMIPv6) for the IP-CAN session to be established. PCRF 150 may determine PCC authorization, if necessary, and may make a decision on the request from home agent 140. PCRF 150 may then return an acknowledgement of IP-CAN session establishment to home agent 140 (step 11). The acknowledgement may include the PCC rules and other information for the PCEF at home agent 140. The PCEF may enforce the PCC rules provided by PCRF 150. PCRF 150 may also provide gateway 130*b* with PCC rules for tunneled packets for the PCC session between home agent 140 and PCRF 150 (step 12). Gateway 130 may use the PCC rules to support QoS for the tunneled packets and/or perform other functions. Home agent 140 may also return a binding acknowledgement to UE 110 (step 13).

A second PCC session may be established between home agent 140 and PCRF 150 in steps 10 and 11. This PCC session may be associated with the mobility protocol given in the IP-CAN Type parameter, the HNP of home agent 140, and the care-of-address (CoA) for UE 110. Home agent 140 may detect for tunneled packets for the PCC session based on a service data flow template provided by PCRF 150 in step 11 and may count these packets for charging (block 14).

As shown in FIGS. 3 and 4, PCC may be supported by indicating to gateway 130 or home agent 140 whether the PCC rules apply to only untunneled packets (e.g., for the first PCC session in FIGS. 3 and 4), or only tunneled packets (e.g., for the second PCC session in FIGS. 3 and 4), or both untunneled and tunneled packets (not shown in FIGS. 3 and 4). Gateway 130 or home agent 140 may count all packets for its PCC session for charging, and each packet would be counted only once by either gateway 130 or home agent 140. Gateway 130 or home agent 140 may be able to properly count packets for its PCC session(s) even when both tunneled traffic (e.g., MIP traffic) and untunneled traffic (e.g., local breakout traffic) are present, e.g., as shown in FIG. 4.

FIGS. 3 and 4 show two designs of utilizing the IP-CAN Type parameter to support PCC for mobility protocols. The techniques may be used for various mobility protocols such as MIP, DSMIPv6, MIPv4-CCoA, PMIP, GTP, etc. As an example, in the case of MIPv4, the IP-CAN Type parameter may be set to MIPv4-CCoA instead of MIP in FIGS. 3 and 4.

For clarity, certain aspects of the techniques have been described for LTE. The techniques may also be used for other wireless networks, which may include other network entities that may perform functions equivalent to those of the network entities shown in FIG. 1. For example, in UMTS Release 8, a PDN gateway may act as both a serving gateway and a home agent for a UE. The PDN gateway may have two PCC sessions for the UE. In one PCC session, the PDN gateway may act as the serving gateway for direct IP access by the UE via a UTRAN. In the other PCC session, the PDN gateway may act as the home agent for mobile IP access by the UE via another RAN. The UE may send both untunneled packets for the direct IP access and tunneled packets for the mobile IP access. The untunneled and tunneled packets may match different service data flow templates at the PDN gateway for the two PCC sessions, and each packet may be counted only once for the appropriate PCC session. This scenario may be shown by process 400 in FIG. 4, in which case home agent 140 may represent the PDN gateway, the first PCC session may be for the direct IP access, and the second PCC session may be for the mobile IP access.

FIG. 5 shows a design of a process 500 for supporting PCC functions in a wireless network. Process 500 may be performed by a PCRF (as described below) or some other network entity. The PCRF may receive a request/indication from a first network entity (e.g., a home agent) to establish a PCC session for a UE accessing the first network entity using a mobility protocol (e.g., MIP, PMIP, DSMIPv6, MIPv4-CCoA, GTP, etc.) (block 512). The PCRF may determine the mobility protocol used by the UE based on the request (block 514). In one design, the PCRF may obtain the IP-CAN Type parameter from the request and may determine the mobility protocol used by the UE based on the IP-CAN Type parameter. The mobility protocol may also be conveyed in other manners, e.g., using other parameters sent in the request.

The PCRF may determine PCC rules for the PCC session based on the mobility protocol and possibly other information (block 516). The PCC rules may comprise a set of at least one filter to identify packets for the PCC session, an indication of whether to count the packets for charging, QoS rules for the packets, charging information for the PCC session, and/or other information related to the PCC session. The PCRF may send the PCC rules to the first network entity (block 518).

The packets for the PCC session may be encapsulated in tunneled packets, which may be exchanged between the UE and the first network entity via a second network entity (e.g., a serving gateway). In this case, the PCRF may determine second PCC rules comprising (i) a set of at least one filter to identify the tunneled packets and (ii) an indication to not count the tunneled packets for charging, which may be implicitly provided by the absence of charging information in the second PCC rules (block 520). For example, the second PCC rules may include only QoS rules and the set of at least one filter and no charging information. The PCRF may send the second PCC rules to the second network entity to apply to the tunneled packets (block 522). The tunneled packets may be counted once for charging by the first network entity and not by the second network entity.

The PCRF may receive a second request from a third network entity (e.g., another serving gateway) to establish a second PCC session for the UE. The UE may have direct IP access with the third network entity and may exchange packets with the third network entity without tunneling. The PCRF may determine a radio access type used by the UE for the third network entity based on the second request. In one design, the PCRF may obtain the IP-CAN Type parameter from the second request and may determine the radio access type used by the UE based on the IP-CAN Type parameter. The PCRF may determine third PCC rules for the second PCC session based on the radio access type used by the UE. The third PCC rules may comprise at least one filter to identify untunneled packets for the second PCC session and other information. The PCRF may then send the third PCC rules to the third network entity.

FIG. 6 shows a design of an apparatus 600 for supporting PCC functions in a wireless network. Apparatus 600 includes a module 612 to receive a request from a first network entity to establish a PCC session for a UE accessing the first network entity using a mobility protocol, a module 614 to determine the mobility protocol used by the UE based on the request, a module 616 to determine PCC rules for the PCC session based on the mobility protocol, a module 618 to send the PCC rules to the first network entity, a module 620 to determine second PCC rules comprising a set of at least one filter to identify tunneled packets for the PCC session and an indication to not count the tunneled packets for charging, and a module 622 to send the second PCC rules to the second network entity to apply to the tunneled packets.

Figure 7:
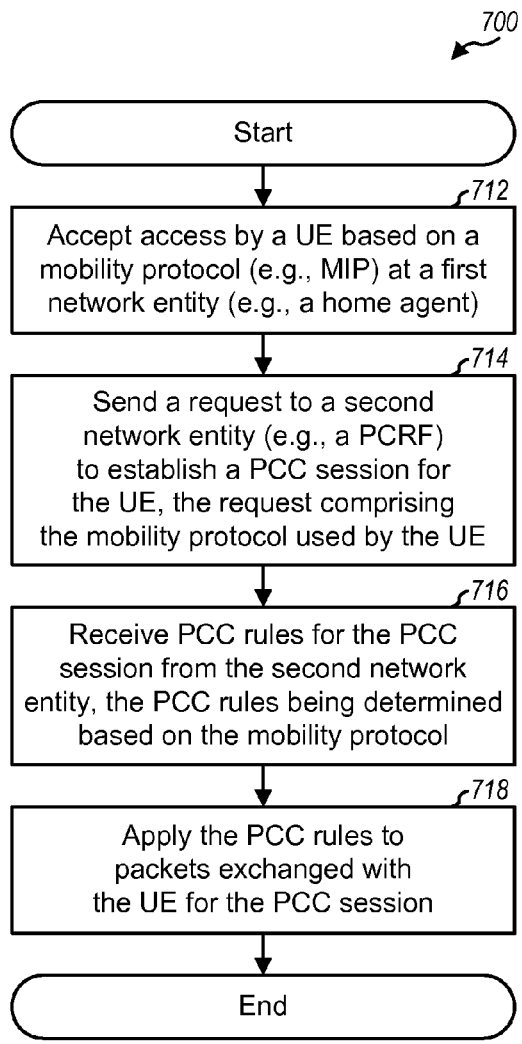
FIGS. 7 and 8 show a process and an apparatus, respectively, to support PCC functions by a home agent.

FIG. 7 shows a design of a process 700 for supporting PCC functions. A first network entity (e.g., a home agent) may accept access by a UE based on a mobility protocol (block 712). The first network entity may send a request to a second network entity (e.g., a PCRF) to establish a PCC session for the UE (block 714). The request may comprise the mobility protocol used by the UE. In one design, the request may comprise the IP-CAN Type parameter, which may be set to the mobility protocol used by the UE.

The first network entity may receive PCC rules for the PCC session from the second network entity (block 716). The PCC rules may be determined by the PCRF based on the mobility protocol. The PCC rules may comprise a set of at least one filter to identify the packets for the PCC session, an indication of whether to count the packets for charging, QoS rules for the packets, charging information for the PCC session, and/or other information for the PCC session. The first network entity may apply the PCC rules to packets exchanged with the UE for the PCC session (block 718). These packets may be sent in tunneled packets. In one design of block 718, the first network entity may identify the packets for the PCC session based on the set of at least one filter obtained from the PCC rules. The first network entity may count the packets for charging.

Figure 8:
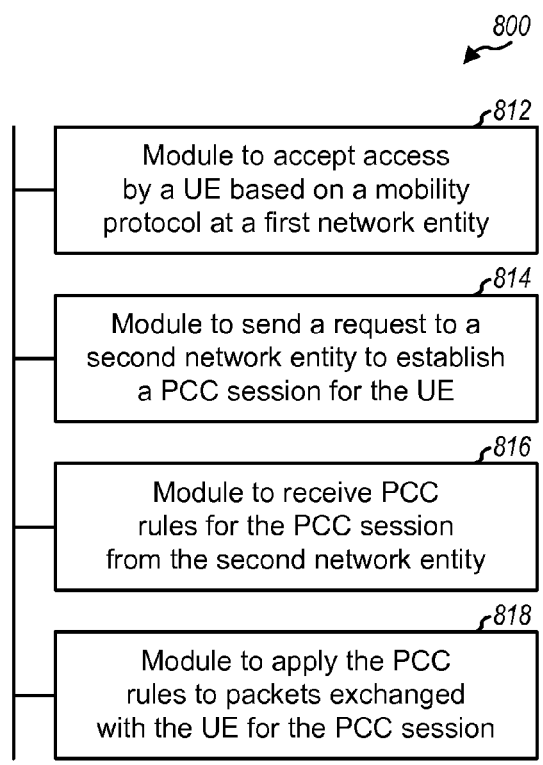

FIG. 8 shows a design of an apparatus 800 for supporting PCC functions. Apparatus 800 includes a module 812 to accept access by a UE based on a mobility protocol at a first network entity, a module 814 to send a request to a second network entity to establish a PCC session for the UE, the request comprising the mobility protocol used by the UE, a module 816 to receive PCC rules for the PCC session from the second network entity, the PCC rules being determined based on the mobility protocol, and a module 818 to apply the PCC rules to packets exchanged with the UE for the PCC session.

FIG. 9 shows a design of a process 900 for supporting PCC functions. A first network entity (e.g., a serving gateway) may receive PCC rules for a PCC session established by a second network entity (e.g., a home agent) for a UE accessing the second network entity using a mobility protocol (e.g., MIP) (block 912). The UE and the second network entity may exchange tunneled packets, which may be forwarded by the first network entity. The first network entity may identify the tunneled packets for the PCC session based on a first set of at least one filter obtained from the PCC rules (block 914). The first network entity may skip counting the tunneled packets for charging, with the tunneled packets being counted by the second network entity for charging instead (block 916).

The first network entity may send a request to establish a second PCC session for the UE accessing the first network entity using direct IP access (block 918). The request may include the IP-CAN Type parameter set to the radio access type used by the UE for the first network entity. The first network entity may receive second PCC rules for the second PCC session, which may be determined based on the radio access type used by the UE (block 920). The first network entity may identify untunneled packets for the second PCC session based on a second set of at least one filter obtained from the second PCC rules (block 922) and may count the untunneled packets for charging (block 924).

FIG. 10 shows a design of an apparatus 1000 for supporting PCC functions. Apparatus 1000 includes a module 1012 to receive PCC rules at a first network entity, the PCC rules being for a PCC session established by a second network entity for a UE accessing the second network entity using a mobility protocol, a module 1014 to identify tunneled packets for the PCC session based on a first set of at least one filter obtained from the PCC rules, a module 1016 to not count the tunneled packets for charging, the tunneled packets being counted by the second network entity for charging, a module 1018 to send a request to establish a second PCC session for the UE accessing the first network entity using direct IP access, a module 1020 to receive second PCC rules for the second PCC session, a module 1022 to identify untunneled packets for the second PCC session based on a second set of at least one filter obtained from the second PCC rules, and a module 1024 to count the untunneled packets for charging.

Figures 11, 12:
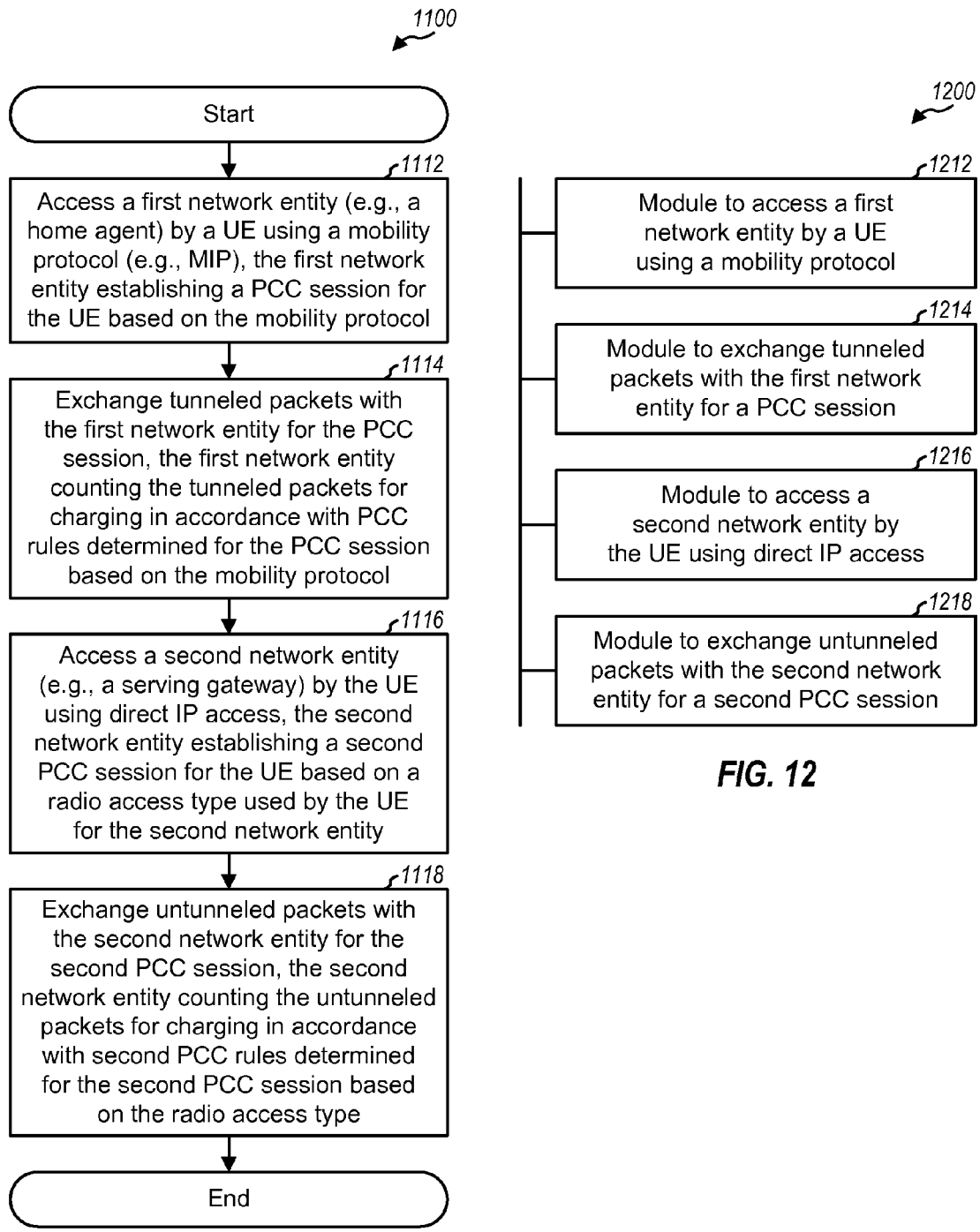
FIGS. 11 and 12 show a process and an apparatus, respectively, to support PCC functions by a UE.

FIG. 11 shows a design of a process 1100 performed by a UE. The UE may access a first network entity (e.g., a home agent) using a mobility protocol (e.g., MIP) (block 1112). The first network entity may establish a PCC session for the UE based on the mobility protocol, e.g., by setting the IP-CAN Type parameter to the mobility protocol. The UE may exchange tunneled packets with the first network entity for the PCC session (block 1114). The first network entity may count the tunneled packets for charging in accordance with PCC rules determined for the PCC session based on the mobility protocol.

The UE may access a second network entity (e.g., a serving gateway) using direct IP access (block 1116). The second network entity may establish a second PCC session for the UE based on a radio access type (e.g., E-UTRA, UTRA, WiMAX, Wi-Fi, etc.) used by the UE for the second network entity. The UE may exchange untunneled packets with the second network entity for the second PCC session (block 1118). The second network entity may count the untunneled packets for charging in accordance with second PCC rules determined for the second PCC session based on the radio access type.

The tunneled packets for the first PCC session may be exchanged between the UE and the first network entity via the second network entity. The tunneled packets may be counted by the first network entity for charging and not count by the second network entity.

FIG. 12 shows a design of an apparatus 1200 for a UE. Apparatus 1200 includes a module 1212 to access a first network entity by the UE using a mobility protocol, the first network entity establishing a PCC session for the UE based on the mobility protocol, a module 1214 to exchange tunneled packets with the first network entity for the PCC session, the first network entity counting the tunneled packets for charging in accordance with PCC rules determined for the PCC session based on the mobility protocol, a module 1216 to access a second network entity by the UE using direct IP access, the second network entity establishing a second PCC session for the UE based on a radio access type used by the UE for the second network entity, and a module 1218 to exchange untunneled packets with the second network entity for the second PCC session, the second network entity counting the untunneled packets for charging in accordance with second PCC rules determined for the second PCC session based on the radio access type.

The modules in FIGS. 6, 8, 10 and 12 may comprise processors, electronics devices, hardware devices, electronics components, logical circuits, memories, software codes, firmware codes, etc., or any combination thereof.

Figure 13:
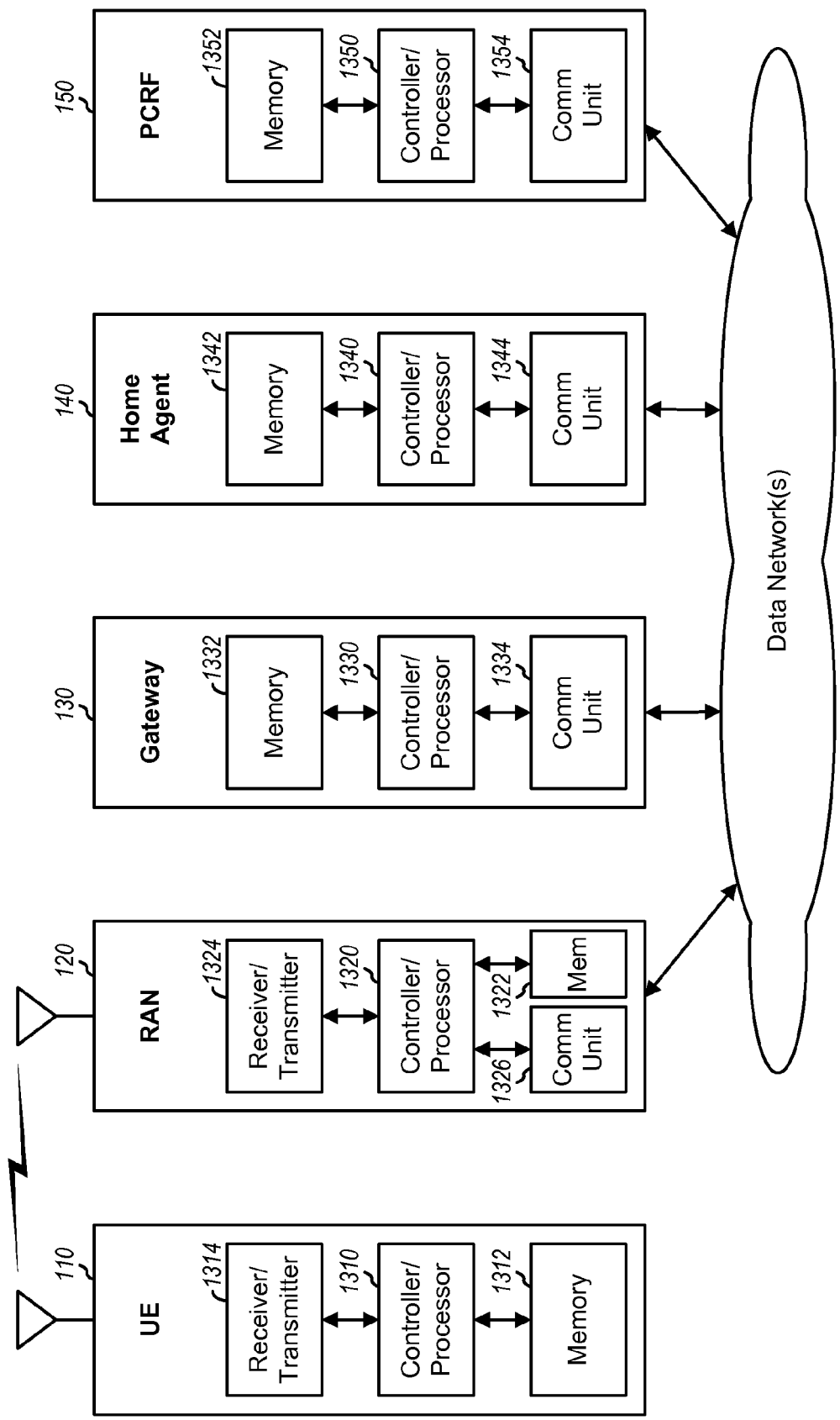
FIG. 13 shows a block diagram of various network entities in FIG. 1.

FIG. 13 shows a block diagram of a design of UE 110, a RAN 120, a gateway 130, home agent 140, and PCRF 150. RAN 120 may be E-UTRAN 120a or non-3GPP RAN 120b in FIG. 1 or some other RAN. Gateway 130 may be serving gateway 130a or non-3GPP gateway 130b in FIG. 1 or some other gateway. For simplicity, FIG. 13 shows (i) one controller/processor 1310, one memory 1312, and one receiver/transmitter 1314 for UE 110, (ii) one controller/processor 1320, one memory (Mem) 1322, one receiver/transmitter 1324, and one communication (Comm) unit 1326 for RAN 120, (iii) one controller/processor 1330, one memory 1332, and one communication unit 1334 for gateway 130, (iv) one controller/processor 1340, one memory 1342, and one communication unit 1344 for home agent 140, and (v) one controller/processor 1350, one memory 1352, and one communication unit 1354 for PCRF 150. In general, each entity may include any number of controllers, processors, memories, transceivers, communication units, etc.

On the downlink, RAN 120 may transmit data and messages to UEs within its coverage area. The data and messages may be processed by processor 1320 and conditioned by transmitter 1324 to generate downlink signals, which may be transmitted to the UEs. At UE 110, the downlink signals from RAN 120 may be received and conditioned by receiver 1314 and processed by processor 1310 to recover data and messages sent to UE 110. Memory 1312 may store program codes and data for UE 110. Processor 1310 may perform or direct process 1100 in FIG. 11 and/or other processes for the techniques described herein. Processor 1310 may also perform the processing for UE 110 in message flows 300 and 400 in FIGS. 3 and 4, respectively.

On the uplink, UE 110 may transmit data and messages to RAN 120. The data and messages may be processed by processor 1310 and conditioned by transmitter 1314 to generate an uplink signal, which may be transmitted to RAN 120. At RAN 120, the uplink signals from UE 110 and other UEs may be received and conditioned by receiver 1324 and further processed by processor 1320 to recover the data and messages sent by the UEs. Memory 1322 may store program codes and data for RAN 120, which may communicate with other network entities via communication unit 1326.

Within gateway 130, processor 1330 may perform processing for the gateway, memory 1332 may store program codes and data for the gateway, and communication unit 1334 may allow the gateway to communicate with other network entities. Processor 1330 may perform or direct process 900 in FIG. 9 and/or other processes for the techniques described herein. Processor 1330 may also perform the processing for gateway 130 in message flow 300 in FIG. 3 and for non-3GPP gateway 130b in message 400 in FIG. 4.

Within home agent 140, processor 1340 may perform processing for the home agent, memory 1342 may store program codes and data for the home agent, and communication unit 1344 may allow the home agent to communicate with other network entities. Processor 1340 may perform or direct process 700 in FIG. 7 and/or other processes for the techniques described herein. Processor 1340 may also perform the processing for home agent 140 in message flows 300 and 400 in FIGS. 3 and 4, respectively.

Within PCRF 150, processor 1350 may perform processing for the PCRF, memory 1352 may store program codes and data for the PCRF, and communication unit 1354 may allow the PCRF to communicate with other network entities. Processor 1350 may perform or direct process 500 in FIG. 5 and/or other processes for the techniques described herein. Processor 1350 may also perform the processing for PCRF 150 in message flows 300 and 400 in FIGS. 3 and 4, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving a request from a first network entity to establish a policy control and charging (PCC) session for a user equipment (UE) accessing the first network entity using a mobility protocol;
determining the mobility protocol used by the UE based on the request;
determining PCC rules for the PCC session based on the mobility protocol;
sending the PCC rules to the first network entity;
wherein packets for the PCC session are encapsulated in tunneled packets exchanged between the UE and the first network entity via a second network entity, further determining second PCC rules comprising a set of at least one filter to identify the tunneled packets and an indication to not count the tunneled packets for charging; and sending the second PCC rules to the second network entity to apply to the tunneled packets.

2. The method of claim 1, wherein the determining the mobility protocol used by the UE comprises
obtaining an IP Connectivity Access Network (IP-CAN) Type parameter from the request, and
determining the mobility protocol used by the UE based on the IP-CAN Type parameter.

3. The method of claim 1, wherein the PCC rules comprise at least one of a set of at least one filter to identify packets for the PCC session, an indication of whether to count the packets for charging, quality-of-service (QoS) rules for the packets, and charging information for the PCC session.

4. The method of claim 1, further comprising:
receiving a second request from a second network entity to establish a second PCC session for the UE;
determining a radio access type used by the UE for the second network entity based on the second request;
determining second PCC rules for the second PCC session based on the radio access type used by the UE; and
sending the second PCC rules to the second network entity.

5. The method of claim 4, wherein packets for the second PCC session are exchanged between the UE and the second network entity without tunneling, and wherein the second PCC rules comprise at least one filter to identify untunneled packets for the second PCC session.

6. The method of claim 4, wherein the first network entity comprises a home agent serving the UE for mobile Internet Protocol (IP) access based on the mobility protocol, and wherein the second network entity comprises a serving gateway serving the UE for direct IP access.

7. An apparatus for wireless communication, comprising:
at least one processor configured
to receive a request from a first network entity to establish a policy control and charging (PCC) session for a user equipment (UE) accessing the first network entity using a mobility protocol,
to determine the mobility protocol used by the UE based on the request, to determine PCC rules for the PCC session based on the mobility protocol, and to send the PCC rules to the first network entity;
wherein packets for the PCC session are encapsulated in tunneled packets exchanged between the UE and the first network entity via a second network entity, and wherein the at least one processor is configured to determine second PCC rules comprising a set of at least one filter to identify the tunneled packets and an indication to not count the tunneled packets for charging, and to send the second PCC rules to the second network entity to apply to the tunneled packets.

8. The apparatus of claim 7, wherein the at least one processor is configured to obtain an IP Connectivity Access Network (IP-CAN) Type parameter from the request, and to determine the mobility protocol used by the UE based on the IP-CAN Type parameter.

9. The apparatus of claim 7, wherein the at least one processor is configured to receive a second request from a second network entity to establish a second PCC session for the UE, to determine a radio access type used by the UE for the second network entity based on the second request, to determine second PCC rules for the second PCC session based on the radio access type used by the UE, and to send the second PCC rules to the second network entity.

10. An apparatus for wireless communication, comprising:
means for receiving a request from a first network entity to establish a policy control and charging (PCC) session for a user equipment (UE) accessing the first network entity using a mobility protocol;
means for determining the mobility protocol used by the UE based on the request;
means for determining PCC rules for the PCC session based on the mobility protocol;
means for sending the PCC rules to the first network entity;
wherein packets for the PCC session are encapsulated in tunneled packets exchanged between the UE and the first network entity via a second network entity, further comprising:
means for determining second PCC rules comprising a set of at least one filter to identify the tunneled packets and an indication to not count the tunneled packets for charging; and
means for sending the second PCC rules to the second network entity to apply to the tunneled packets.

11. The apparatus of claim 10, wherein the means for determining the mobility protocol used by the UE comprises
means for obtaining an IP Connectivity Access Network (IP-CAN) Type parameter from the request, and
means for determining the mobility protocol used by the UE based on the IP-CAN Type parameter.

12. The apparatus of claim 10, further comprising:
means for receiving a second request from a second network entity to establish a second PCC session for the UE;
means for determining a radio access type used by the UE for the second network entity based on the second request;
means for determining second PCC rules for the second PCC session based on the radio access type used by the UE; and
means for sending the second PCC rules to the second network entity.

13. A non-transitory computer-readable medium comprising:
code for causing at least one computer to receive a request from a first network entity to establish a policy control and charging (PCC) session for a user equipment (UE) accessing the first network entity using a mobility protocol,
code for causing the at least one computer to determine the mobility protocol used by the UE based on the request,
code for causing the at least one computer to determine PCC rules for the PCC session based on the mobility protocol, and
code for causing the at least one computer to send the PCC rules to the first network entity;
wherein the establishing the PCC rules comprises identifying the packets for the PCC session based on a set of at least one filter obtained from the PCC rules, and counting the packets for charging; and
wherein packets for the PCC session are encapsulated in tunneled packets exchanged between the UE and the first network entity via a second network entity, further comprising:
code for determining second PCC rules comprising a set of at least one filter to identify the tunneled packets and an indication to not count the tunneled packets for charging; and
code for sending the second PCC rules to the second network entity to apply to the tunneled packets.

14. A method for wireless communication, comprising:
accepting access by a user equipment (UE) based on a mobility protocol at a first network entity;
sending a request to a second network entity to establish a policy control and charging (PCC) session for the UE, the request comprising the mobility protocol used by the UE;
receiving PCC rules for the PCC session from the second network entity, the PCC rules being determined based on the mobility protocol; and
applying the PCC rules to packets exchanged with the UE for the PCC session;
wherein the applying the PCC rules comprises identifying the packets for the PCC session based on a set of at least one filter obtained from the PCC rules, and counting the packets for charging; and
wherein packets for the PCC session are encapsulated in tunneled packets exchanged between the UE and the first network entity via a second network entity, further comprising:
determining second PCC rules comprising a set of at least one filter to identify the tunneled packets and an indication to not count the tunneled packets for charging; and
sending the second PCC rules to the second network entity to apply to the tunneled packets.

15. The method of claim 14, further comprising:
setting an IP Connectivity Access Network (IP-CAN) Type parameter based on the mobility protocol used by the UE; and
generating the request comprising the IP-CAN Type parameter.

16. The method of claim 14, wherein the PCC rules comprise at least one of a set of at least one filter to identify the packets for the PCC session, an indication of whether to count the packets for charging, quality-of-service (QoS) rules for the packets, and charging information for the PCC session.

17. The method of claim 14, wherein the first network entity comprises a home agent for the UE, and wherein the second network entity comprises a Policy Control and Charging Rules Function (PCRF).

18. An apparatus for wireless communication, comprising:
at least one processor configured to accept access by a user equipment (UE) based on a mobility protocol at a first network entity, to send a request to a second network entity to establish a policy control and charging (PCC) session for the UE, the request comprising the mobility protocol used by the UE, to receive PCC rules for the PCC session from the second network entity, the PCC rules being determined based on the mobility protocol, and to apply the PCC rules to packets exchanged with the UE for the PCC session;
wherein the at least one processor is configured to identify the packets for the PCC session based on a set of at least one filter obtained from the PCC rules, and to count the packets for charging; and
wherein packets for the PCC session are encapsulated in tunneled packets exchanged between the UE and the first network entity via a second network entity, further comprising:
to determine second PCC rules comprising a set of at least one filter to identify the tunneled packets and an indication to not count the tunneled packets for charging; and
to send the second PCC rules to the second network entity to apply to the tunneled packets.

19. The apparatus of claim 18, wherein the at least one processor is configured to set an IP Connectivity Access Network (IP-CAN) Type parameter based on the mobility protocol used by the UE, and to generate the request comprising the IP-CAN Type parameter.

20. A method for wireless communication, comprising:
receiving policy control and charging (PCC) rules at a first network entity, the PCC rules being for a PCC session established by a second network entity for a user equipment (UE) accessing the second network entity using a mobility protocol;
identifying tunneled packets for the PCC session based on a first set of at least one filter obtained from the PCC rules; and
not counting the tunneled packets for charging, the tunneled packets being counted by the second network entity for charging.

21. The method of claim 20, further comprising:
sending a request to establish a second PCC session for the UE accessing the first network entity using direct Internet Protocol (IP) access;
receiving second PCC rules for the second PCC session, the second PCC rules being determined based on a radio access type used by the UE for the second network entity;
identifying untunneled packets for the second PCC session based on a second set of at least one filter obtained from the second PCC rules; and
counting the untunneled packets for charging.

22. An apparatus for wireless communication, comprising:
at least one processor configured to receive policy control and charging (PCC) rules at a first network entity, the PCC rules being for a PCC session established by a second network entity for a user equipment (UE) accessing the second network entity using a mobility protocol, to identify tunneled packets for the PCC session based on a first set of at least one filter obtained from the PCC rules, and to not count the tunneled packets for charging, the tunneled packets being counted by the second network entity for charging.

23. The apparatus of claim 22, wherein the at least one processor is configured to send a request to establish a second PCC session for the UE accessing the first network entity using direct Internet Protocol (IP) access, to receive second PCC rules for the second PCC session, the second PCC rules being determined based on a radio access type used by the UE for the second network entity, to identify untunneled packets for the second PCC session based on a second set of at least one filter obtained from the second PCC rules, and to count the untunneled packets for charging.

24. A method for wireless communication, comprising:
accessing a first network entity by a user equipment (UE) using a mobility protocol, the first network entity establishing a policy control and charging (PCC) session for the UE based on the mobility protocol;
exchanging tunneled packets with the first network entity for the PCC session, the first network entity counting the tunneled packets for charging in accordance with PCC rules determined for the PCC session based on the mobility protocol;
accessing a second network entity by the UE using direct Internet Protocol (IP) access, the second network entity establishing a second PCC session for the UE based on a radio access type used by the UE for the second network entity; and
exchanging untunneled packets with the second network entity for the second PCC session, the second network entity counting the untunneled packets for charging in accordance with second PCC rules determined for the second PCC session based on the radio access type.

25. The method of claim 24, wherein the tunneled packets are exchanged between the UE and the first network entity via the second network entity, and wherein the second network entity does not count the tunneled packets for charging.

26. The method of claim 24, wherein the first network entity comprises a home agent serving the UE for mobile IP access based on the mobility protocol, and wherein the second network entity comprises a serving gateway serving the UE for the direct IP access.

27. An apparatus for wireless communication, comprising:
at least one processor configured to access a first network entity by a user equipment (UE) using a mobility protocol, the first network entity establishing a policy control and charging (PCC) session for the UE based on the mobility protocol, and
to exchange tunneled packets with the first network entity for the PCC session, the first network entity counting the tunneled packets for charging in accordance with PCC rules determined for the PCC session based on the mobility protocol; wherein the at least one processor is configured to access a second network entity by the UE using direct Internet Protocol (IP) access, the second network entity establishing a second PCC session for the UE based on a radio access type used by the UE for the second network entity, and to exchange untunneled packets with the second network entity for the second PCC session, the second network entity counting the untunneled packets for charging in accordance with second PCC rules determined for the second PCC session based on the radio access type.

* * * * *